UNITED STATES PATENT OFFICE.

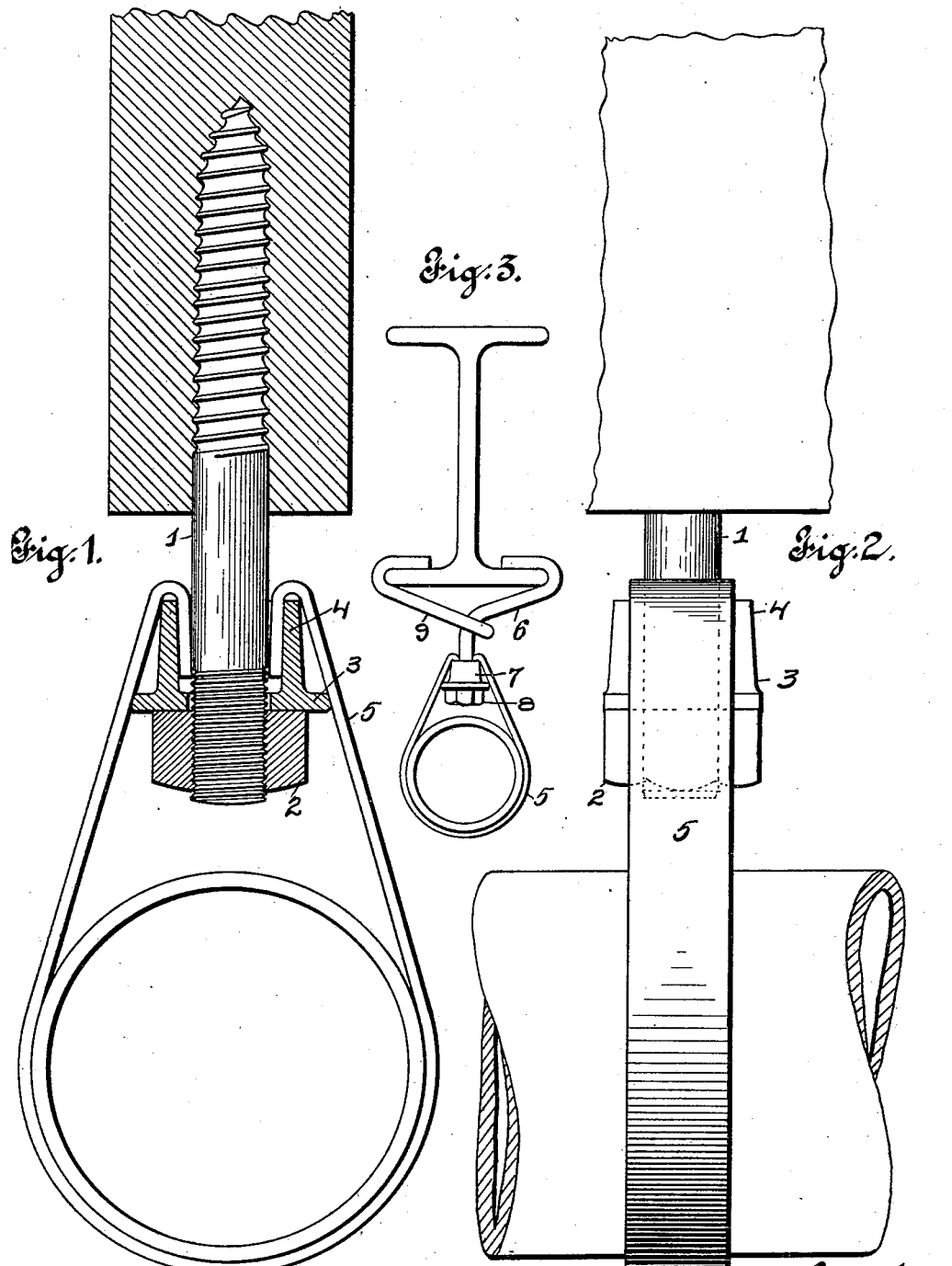

CHARLES W. SMART, OF CARBONDALE, ILLINOIS.

PIPE-HANGER.

SPECIFICATION forming part of Letters Patent No. 705,971, dated July 29, 1902.

Application filed September 9, 1901. Serial No. 74,730. (No model.)

*To all whom it may concern:*

Be it known that I, CHARLES W. SMART, of the city of Carbondale, Jackson county, State of Illinois, have invented certain new and useful Improvements in Pipe-Hangers, of which the following is a full, clear, and exact description, reference being had to the accompanying drawings, forming a part hereof.

This invention relates to pipe-hangers; and it consists of the novel construction, combination, and arrangement of parts hereinafter shown, described, and claimed.

The object of this invention is to provide a simple, durable, and inexpensive pipe-hanger consisting of a washer supported upon a bolt and a flexible metallic band or support having its ends connected to the washer and forming a loop adapted to receive and support the pipe.

Figure 1 is a view showing the application of my improved pipe-hanger with the washer in section. Fig. 2 is a side view of the same. Fig. 3 is a view showing a modified construction which may be connected to metallic I-beams without the use of the screw-bolt.

1 indicates the screw-bolt, which may be of usual construction, having an integral head on its lower end, or may be threaded, as shown, and provided with a nut 2, which upholds the washer.

3 indicates a washer, which is provided on its upper surface with an integral wall or flange 4, forming a rectangular casing around the bolt and within which the ends of the metallic support are contained. The said support may consist, as shown, of a strap 5 of sheet metal cut in the required length and having its end inserted between the wall or flange 4 and the body of the bolt 1, thereby securing it firmly in position to uphold the pipe. When arranged as described, the strap forms a loop within which the pipe may be mounted, and the ends of the strap will be securely held in position by the pressure of the wall or flange 4 and the bolt 1 against their outer and inner surfaces. Instead of using a strap I may make use of wire or other similar supports by connecting the ends of the different sections to the washer in any known manner.

In Fig. 3 I have shown a form of hanger which may be used without the screw-bolt and connected to metallic I-beams or other similar supports. This form of hanger consists of a strap 6 carrying a washer 7 similar to the washer 3, and a nut 8 serving the same purpose as the nut 2. The strap 6 is bent into suitable shape and is clamped over the I-beam as shown, and is held in position by the coöperating strap 9 which has its lower end connected to the strap 6 immediately above the washer 3 and its upper end bent over the I-beam in the same manner as the strap 6, thereby forming a very firm and secure connection for supporting the pipe-hanger. The same form of strap or pipe support may be made use of as in the form above described.

A pipe-hanger constructed as shown and described is simple and may be readily applied in position. All the parts are strong and durable and cannot become disconnected after they have once been applied in use.

I claim—

1. A pipe-hanger consisting of a threaded rod adapted to be screwed in a stationary support, and a washer provided with a flange and adjustably carried by said rod, in combination with a metallic strap or support bent to form a loop for receiving the pipe, and its ends bent and held within the washer between the flange and the rod, and a nut for supporting the washer, substantially as specified.

2. A pipe-hanger consisting of a rod having both its ends threaded, a washer removably carried thereby provided with a flange, a strap bent into the form of a loop to support the pipe, hooks formed on the end of the strap and engaging the flange of the washer, and a nut placed upon the rod beneath the washer for supporting and adjusting the same, substantially as specified.

In testimony whereof I affix my signature in presence of two witnesses.

CHARLES W. SMART.

Witnesses:
ALFRED A. EICKS,
JOHN D. RIPPEY.